(12) United States Patent
Sinha et al.

(10) Patent No.: US 11,089,061 B1
(45) Date of Patent: Aug. 10, 2021

(54) THREAT ISOLATION FOR DOCUMENTS USING DISTRIBUTED STORAGE MECHANISMS

(71) Applicant: CA, INC., San Jose, CA (US)

(72) Inventors: Nikhil Sinha, Campbell, CA (US); Alexander Harris, Hopkinton, MA (US); John Steenbruggen, Framingham, MA (US); Ananta Krishna Vadlamani, Pleasanton, CA (US)

(73) Assignee: CA, INC., San Jose, CA (US)

( * ) Notice: Subject to any disclaimer, the term of this patent is extended or adjusted under 35 U.S.C. 154(b) by 314 days.

(21) Appl. No.: 16/368,324

(22) Filed: Mar. 28, 2019

(51) Int. Cl.
*H04L 29/06* (2006.01)
*H04L 12/58* (2006.01)

(52) U.S. Cl.
CPC .......... *H04L 63/20* (2013.01); *H04L 51/08* (2013.01); *H04L 63/06* (2013.01); *H04L 63/145* (2013.01)

(58) Field of Classification Search
CPC ......... H04L 51/12; H04L 51/22; H04L 63/10; H04L 63/20; G06F 21/56; G06F 2221/2149
See application file for complete search history.

(56) References Cited

U.S. PATENT DOCUMENTS

| | | | |
|---|---|---|---|
| 7,913,078 B1 * | 3/2011 | Stewart ................... | H04L 51/12 713/152 |
| 2002/0007453 A1 * | 1/2002 | Nemovicher ....... | H04L 63/0823 713/155 |
| 2006/0015747 A1 * | 1/2006 | Van de Ven .......... | H04L 63/145 713/188 |

* cited by examiner

*Primary Examiner* — Jason K Gee
(74) *Attorney, Agent, or Firm* — Foley & Lardner LLP

(57) ABSTRACT

A cloud device is configured in an email transmission pathway. The cloud device receives an email attachment whose maliciousness status is determined to be unknown. The cloud device encrypts the email attachment and delivers the encrypted attachment to the recipient. When the recipient attempts to access the encrypted attachment, the cloud device re-determines the maliciousness status of the attachment. If the re-determined maliciousness status is benign, the cloud device allows the encrypted attachment to be decrypted and opened locally on the recipient's device. If the re-determined maliciousness status is still unknown, the cloud device provides a cloud-based viewing solution to the recipient using an isolation service.

20 Claims, 5 Drawing Sheets

THREAT ISOLATION FOR DOCUMENTS USING DISTRIBUTED STORAGE MECHANISMS

TECHNICAL FIELD

This disclosure pertains generally to computing device security, and more specifically to threat isolation for email attachments through automatic email attachment encryption/decryption and cloud-based (or on-premises) isolation service.

BACKGROUND

Email security providers generally scan the bodies of emails for malicious links, and utilize various methodologies to mitigate such risks. For instance, some email security providers use isolation services to examine and process links within the bodies of emails.

To prevent malicious links from being detected by such security providers, computer hackers and other practitioners of malware distribution seek alternative ways to deliver malicious links to targeted victims, such as adding malicious links into email attachments. Malicious links in attachments may be scanned by conventional email scanning. However, where the status of the link cannot be definitively determined as benign or malicious, conventional systems make an adjudication at scan time as to whether or not to deliver the attachment with the link to the target recipient. This can result in false negatives which put the user at risk and/or false positives which prevent the user from receiving legitimate links. With false negatives, these emails, including the malicious attachments, are delivered to the recipients. Since such malware-containing attachments are delivered to the recipients, the recipients are susceptible to attacks when they open the attachments, or click on the links included therein.

It would be desirable to address these issues.

SUMMARY

An email attachment threat isolation manager may be configured in an email transmission pathway. The email attachment threat isolation manager may receive an email with an attachment sent to a user account of a target recipient. Before delivering the email to the user account, the email attachment threat isolation manager first determines a maliciousness status of the attachment. Responsive to determining that the attachment is benign, the email attachment threat isolation manager directly delivers the email to the user account. Responsive to the email attachment being malicious, the email attachment threat isolation manager implements certain security actions. Responsive to the email attachment being unknown (i.e., not being definitively determined to be malicious or benign), the email attachment threat isolation manager automatically encrypts the email attachment. After the encryption, the email attachment threat isolation manager delivers the email with the encrypted attachment to the user account of the recipient. Subsequent to the receipt of the email, the recipient may attempt to access the encrypted attachment, which triggers a corresponding indication to be transmitted to the email attachment threat isolation manager. Responsive to the receipt of the corresponding indication of the attempted access, the email attachment threat isolation manager re-determines the maliciousness status of the attachment, and performs an additional action concerning the attempt to access the encrypted attachment based on the re-determined maliciousness status of the attachment.

More specifically, if the re-determined maliciousness status of the encrypted attachment is malicious, the email attachment threat isolation manager implements certain security actions. If the re-determined maliciousness status of the encrypted attachment is benign, the email attachment threat isolation manager transmits a directive to the endpoint device of the recipient to automatically decrypt the encrypted attachment, thereby allowing the encrypted attachment to be opened locally on the recipient's device. If the re-determined maliciousness status of the encrypted attachment is still unknown, the email attachment threat isolation manager provides the recipient access to the encrypted attachment using a cloud-based (or on-premises) isolation service.

The email attachment processed in the above-described manner does not require the email attachment to be stored remotely or delivered as a URL to the recipient, but rather allows the email attachment to be delivered safely to the user's inbox even where there is a potential safety concern, which offers better user experience to the recipient. In addition, by integrating, or in conjunction with, a cloud-based or on-premises isolation service, any potential threat is still isolated from the recipient's device and the network of the organization with which the recipient is associated. Therefore, security is not compromised.

The Figures depict various implementations for purposes of illustration only. One skilled in the art will readily recognize from the following discussion that alternative implementations of the structures and methods illustrated herein may be employed without departing from the principles described herein.

DETAILED DESCRIPTION

Figure 1:
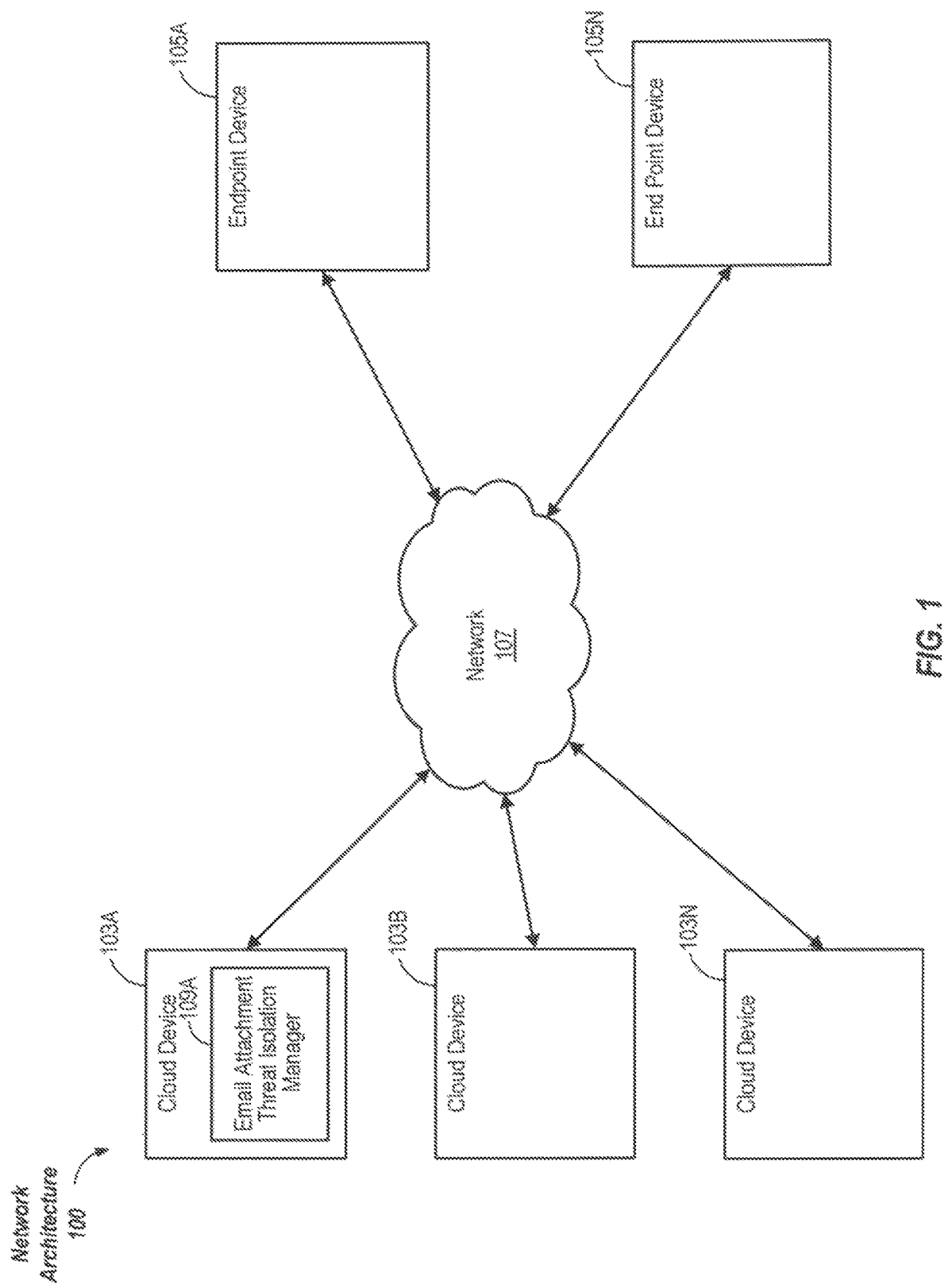
FIG. 1 is a block diagram of an exemplary network architecture in which an email attachment threat isolation manager can be implemented, according to some implementations.

FIG. 1 is a block diagram illustrating an exemplary network architecture 100 in which an email attachment threat isolation manager 109 can be implemented. In the illustrated network architecture 100, cloud devices 103A, 103B, and 103N, as well as endpoint devices 105A and 105N, are communicatively coupled to a network 107. In FIG. 1, an email attachment threat isolation manager 109A is illustrated as residing on a cloud device 103A to implement a cloud-based threat isolation service for email attachments sent to the endpoint devices 105A and/or 105N. In other implementations, the email attachment threat isolation manager 109A can be distributed across multiple computers in other ways as desired. In FIG. 1, cloud devices 103A-N are connected to endpoint devices 105A and 105N via network 107.

Many different networking technologies may be used to provide connectivity from each of endpoint devices 105A-N and cloud devices 103A-N to network 107. Some examples include: LAN, WAN (e.g., the internet), cellular network, and various wireless technologies.

Cloud devices 103A-N (also referred to individually and collectively as 103) may include one or computing components having data processing, storing, and communication capacities. For example, a cloud device 103 may include an email attachment threat isolation manager 109 for implementing cloud-based threat isolation service. While the cloud devices 103A-N are illustrated as a standalone device in some implementations, a cloud device 103 may be integrated into another device or system. For instance, a cloud device may be integrated into an email server or an email security gateway to cooperate with the server or gateway in implementing the cloud-based threat isolation service. In some implementations, a cloud device 103 may be a backend server, which may include one or more hardware or virtual servers or server arrays.

Endpoint devices 105A and 105N are able to access applications and/or data on cloud devices 103A-N using, for example, the cloud-based threat isolation service, an email application, a web browser, or other software (not shown). This enables endpoint devices 105A and 105N to run and otherwise interact with applications on a cloud device 103 and/or to access data hosted by a cloud device or other devices connected to a cloud device 103 through wireless or wired connections. For instance, endpoint devices 105A and 105N may receive emails delivered by cloud devices 103A-N, and access encrypted email attachments managed by the cloud devices. Endpoint devices 105A and 105N can be in the form of, for example, mobile computing devices comprising portable computer systems capable of connecting to a network 107 and running applications, or desktop computers. Some examples of mobile computing devices are smartphones, tablet computers, laptop computers, hybrids, convertible laptops, smart watches, smart bracelets, and other types of wearable computing devices.

Although FIG. 1 illustrates three cloud devices 105A-N and two endpoint devices 105A and 105N as an example, in practice many more (or fewer) computers can be deployed. In some example implementations, the network 107 is in the form of the internet. In some example implementations, the network 107 includes more than one network. Other networks 107 or network-based environments are also contemplated in some implementations.

Figure 2:
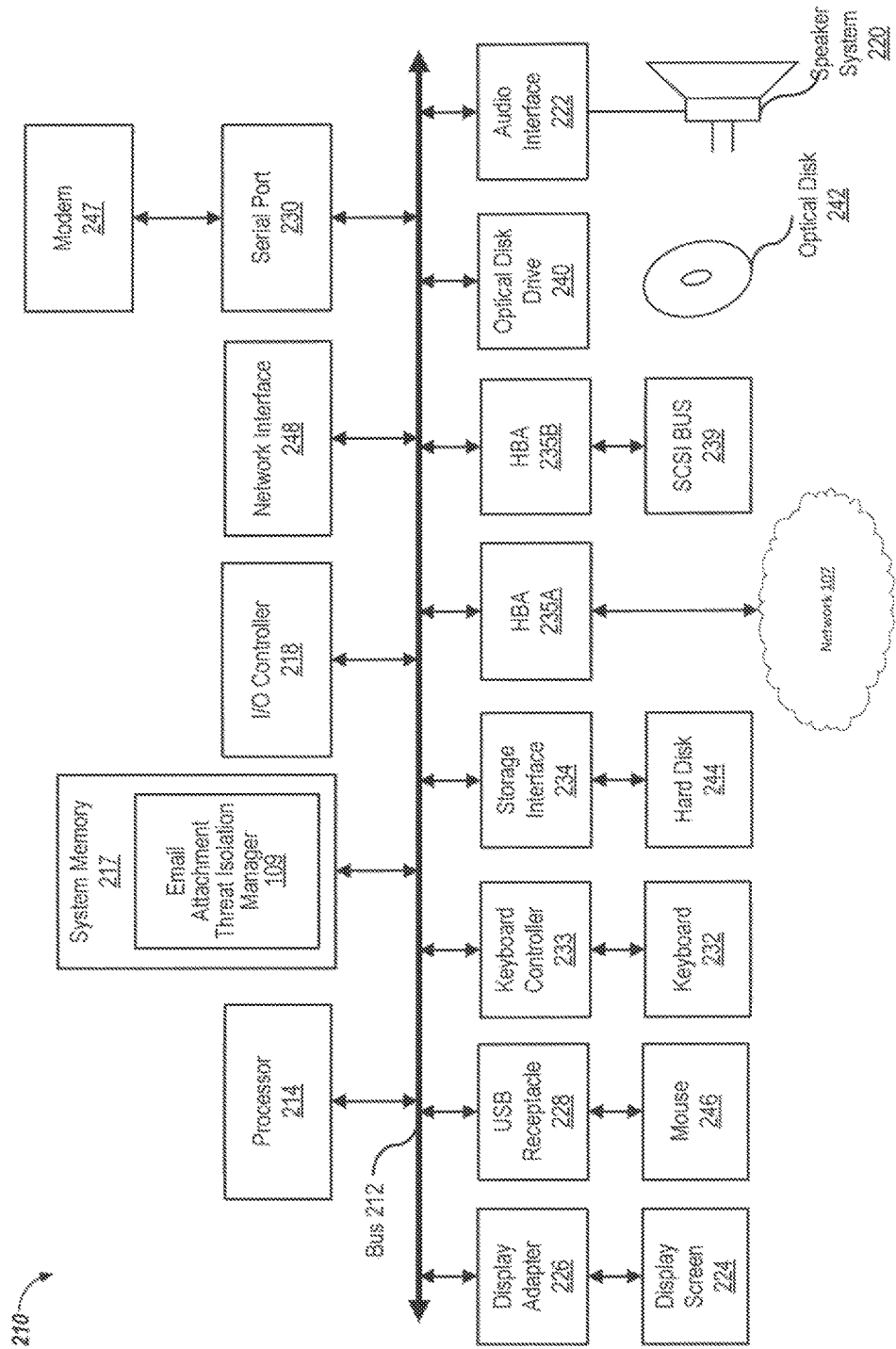
FIG. 2 is a block diagram of a computer system suitable for implementing a cloud-based threat isolation service, according to some implementations.

FIG. 2 is a block diagram of a computer system 210 suitable for implementing a cloud-based threat isolation service. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or another pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different implementations, the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the email attachment threat isolation manager 109 is illustrated as residing in system memory 217. The workings of the email attachment threat isolation manager 109 are explained in greater detail below in conjunction with FIGS. 3-5.

The storage interface 234 is coupled to one or more hard disks 244 (and/or other standard storage media). The hard disk(s) 244 may be a part of computer system 210 or may be physically separate and accessed through other interface systems.

The network interface 248 and/or modem 247 can be directly or indirectly communicatively coupled to a network 107 such as the internet. Such coupling can be wired or wireless.

Figure 3:
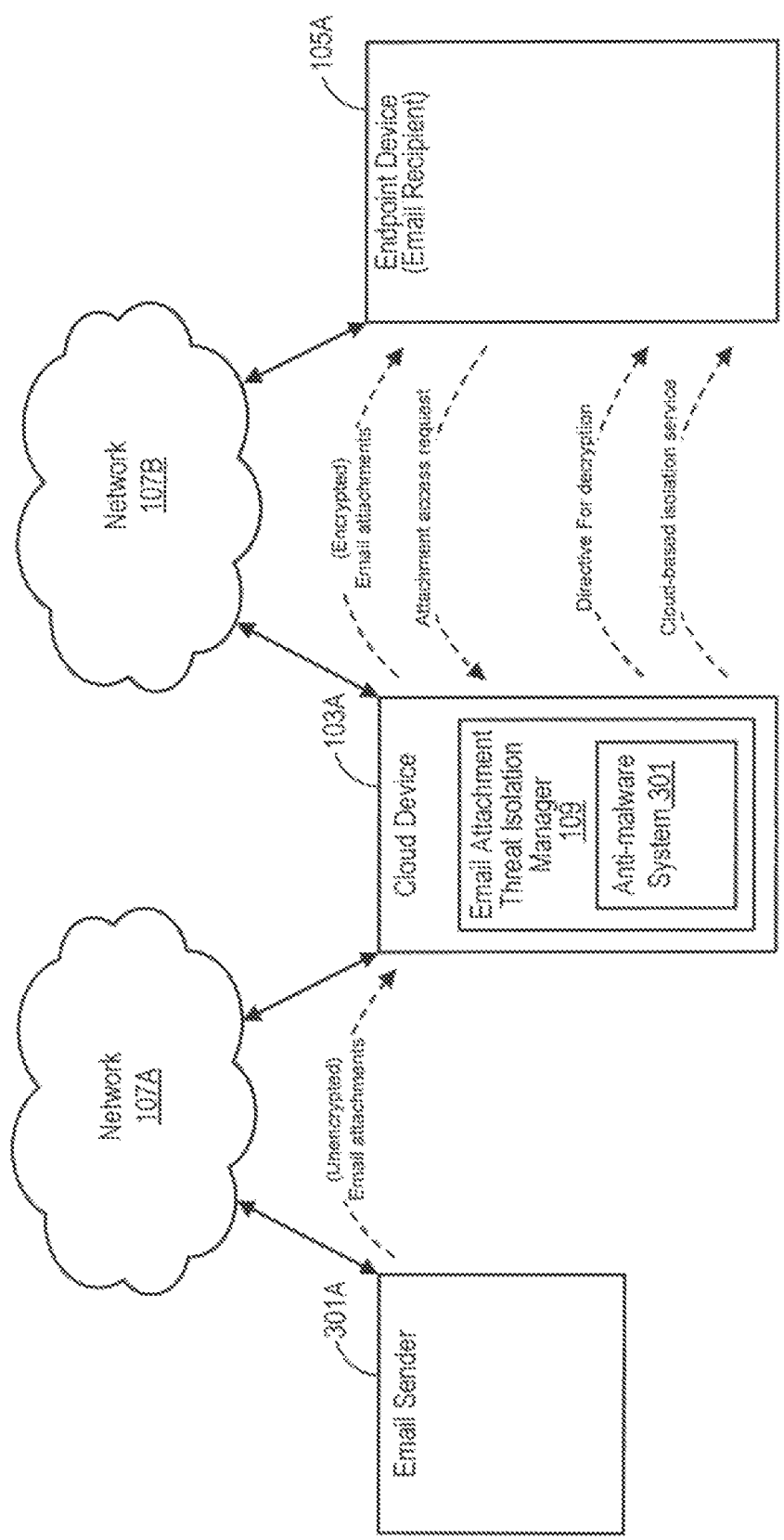
FIG. 3 is a block diagram of the operation of an email attachment threat isolation manager, according to some implementations.
Figure 4:
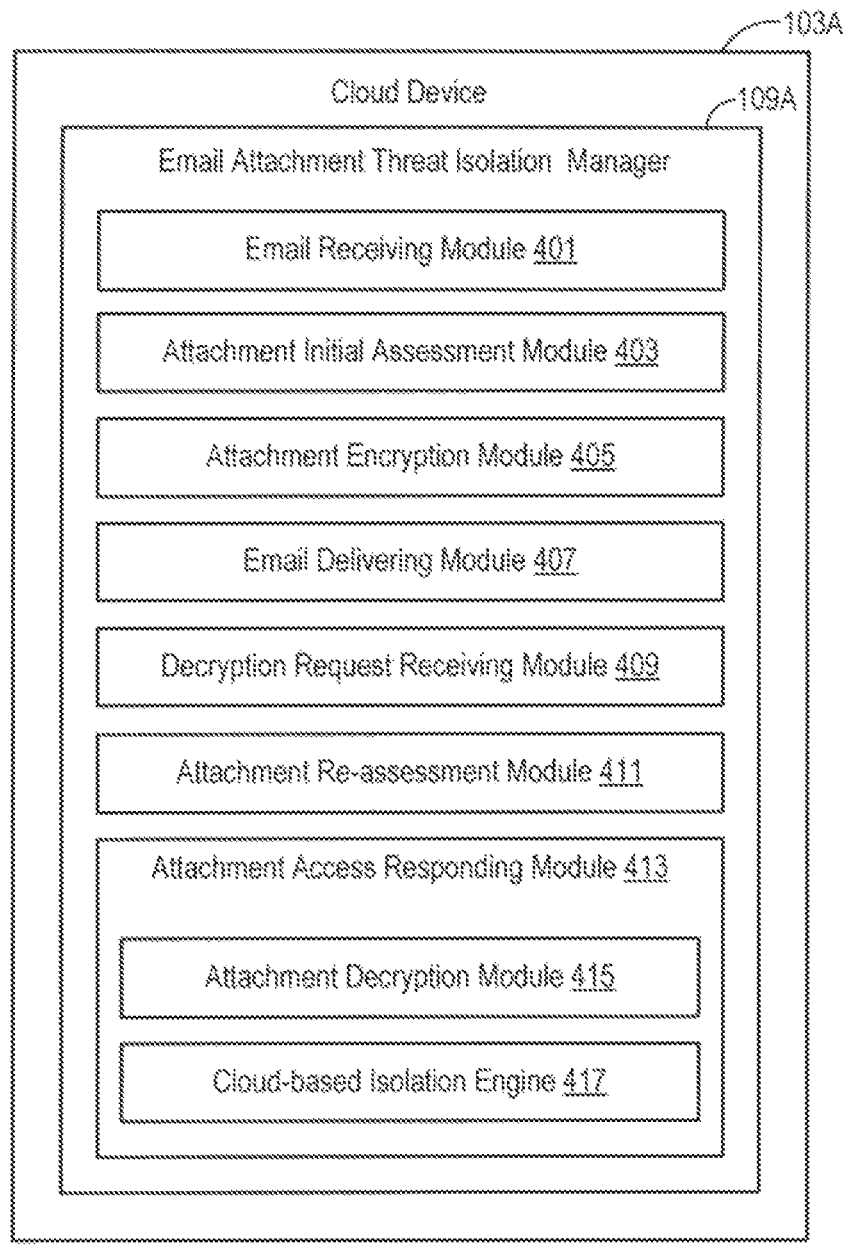
FIG. 4 is a block diagram of specific modules of an email attachment threat isolation manager on a cloud device, according to some implementations.
Figure 5:
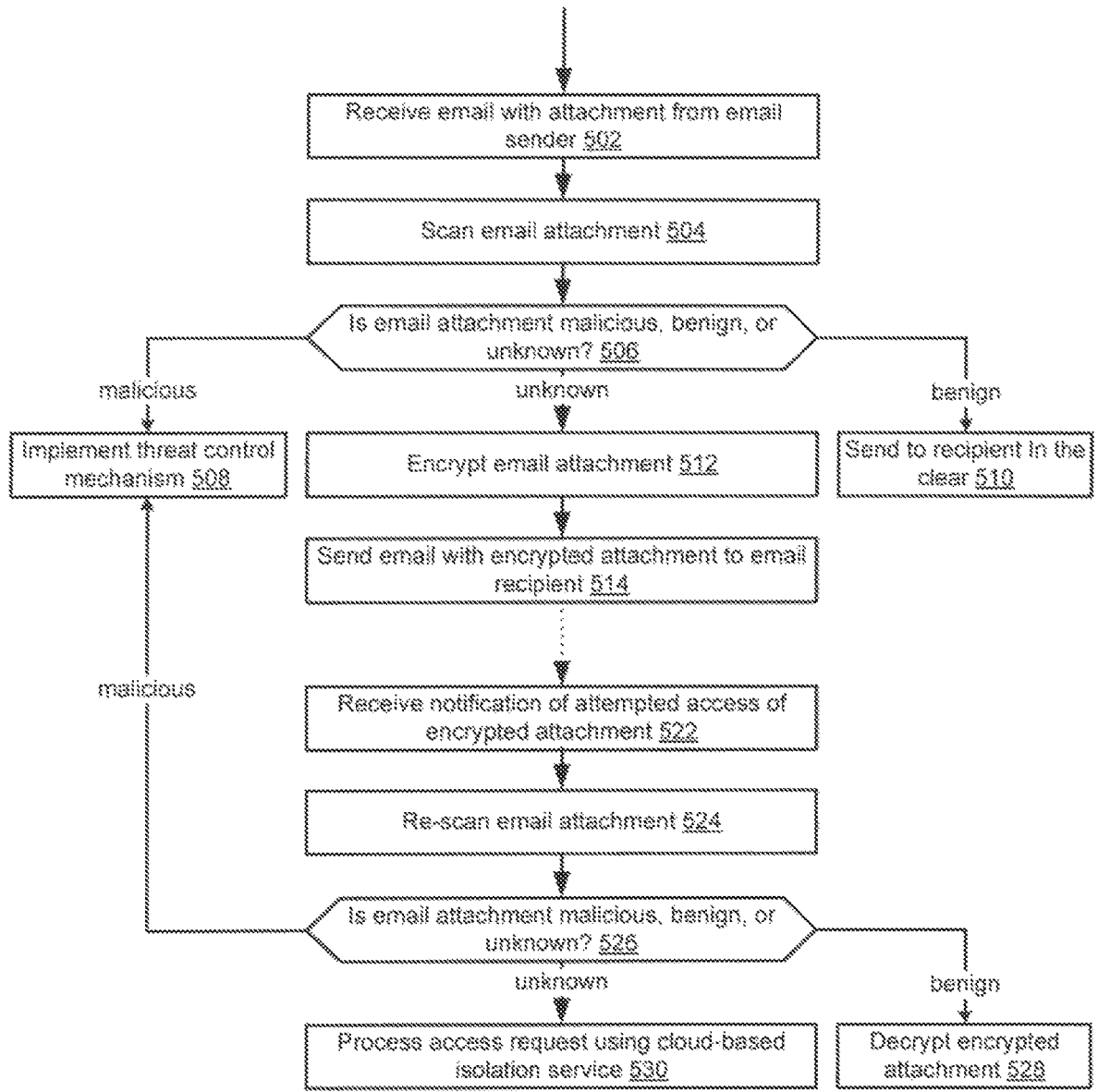
FIG. 5 is a flowchart of a method for implementing a cloud-based threat isolation service, according to some implementations.

FIG. 3 illustrates the operation of an email attachment threat isolation manager 109 on a cloud device 103, according to some implementations. As noted above, the functionalities of the email attachment threat isolation manager 109 may reside on a cloud device 103, an endpoint device 105, or be distributed between multiple computer systems 210, including within a cloud-based computing environment in which certain functionalities of the email attachment threat isolation manager 109 are provided as a service over a network 107. It is to be understood that although the email attachment threat isolation manager 109 is illustrated in FIG. 3 as a single entity, the illustrated email attachment threat isolation manager 109 represents a collection of functionalities, which can be instantiated as a single or multiple modules as desired (instantiations of specific, multiple module email attachment threat isolation manager 109 are illustrated in FIGS. 4-5). It is to be understood that the modules of the email attachment threat isolation manager 109 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer," "cloud device," and "endpoint device" mean one or more computers configured and/or programmed to execute the described functionality. Additionally, program code to implement the functionalities of the email attachment threat isolation manager 109 can be stored on computer-readable storage media. Any form of tangible computer readable storage medium can be used in this context, such as magnetic, optical or flash storage media. As used herein, the term "computer-readable storage medium" does not mean an electrical signal separate from an underlying physical medium.

The email attachment threat isolation manager 109 can be instantiated as a part of, or in conjunction with, an anti-malware system 301. In some implementations, the email attachment threat isolation manager 109 may be a part of an anti-malware system 301 that runs on a backend server. In other implementations, the email attachment threat isolation manager 109 may communicate with or otherwise work in conjunction with a separate anti-malware system 301, which can be located remotely, on a backend server, or locally on an email server or security gateway or the like, or can be distributed between these or other components. The anti-malware system 301 may have libraries, a database, or other collections of virus and/or other malware signatures, which can be used to scan files to identify malware. These signatures, collections, and/or other information are frequently updated, as a centralized anti-malware system 301 with a large end user base is constantly receiving new signatures, telemetry data, and other information for identifying new and modified malware. The anti-malware system 301 can also use other technologies to identify malware, such as heuristic analysis, etc.

The email attachment threat isolation manager 109 can prevent potential threats in email attachments from reaching endpoint devices 105. The email attachment threat isolation manager 109 may achieve this objective through the integration of email scanning, encryption, and document isolation. In brief, the email attachment threat isolation manager 109 may scan an email attachment to determine its maliciousness status when an email is sent from an email sender in an unencrypted form. The determined maliciousness status may be malicious, benign, or unknown. If the attachment is determined to be safe or is determined to contain malware, the unencrypted attachment may be delivered to the recipient or a security action may be taken, as described in further detail in conjunction with FIGS. 4 and 5. If the scan cannot definitively determine whether the email attachment is safe or contains malware (i.e., the email attachment is in a "grey" zone that the anti-malware system functionality cannot definitively identify as malicious or benign), to prevent potential risks the email attachment threat isolation manager 109 may automatically encrypt the email attachment. Because the email attachment is encrypted, it cannot be opened by the recipient, thus preventing any potential threats such as malicious links in the attachment from being activated on the recipient's device (i.e., endpoint device 105A in FIG. 3). If the recipient attempts to access the encrypted attachment, an indication is transmitted to the email attachment threat isolation manager 109, which re-scans the attachment to determine if a more definitive status (i.e., benign or malicious) can now be determined. It is to be understood that because the centralized anti-malware system frequently receives updated information, new signatures, etc., it is not improbable that this subsequent re-scan can result in a definitive determination although the earlier scan could not. If the attachment is determined to be benign, a directive including instructions to decrypt the encrypted attachment may be sent to the endpoint device 105A, to allow the encrypted file to be opened locally on the endpoint device. If the attachment is determined to definitively malicious, then a security action can be performed, as described in more detail below. If, however, it is still not clear whether the attachment is safe or not (i.e., the status is still unknown, a cloud-based (or on-premises) isolation service may be then utilized for presenting the attachment to the recipient. In this way, an email attachment of unknown maliciousness status can be securely provided to an endpoint device, and does not need to be stored on the backend with only a URL provided to the recipient. This provides a better experience to the end users and email recipients. In addition, the illustrated approach also has a lower cost and reduces compliance complexities for the end users, as discussed below.

More specific details regarding the email attachment threat isolation manager 109 on a cloud device 103 implementing the expected threat isolation functions are provided in conjunction with FIGS. 4 and 5.

FIG. 4 is a block diagram of specific modules of an email attachment threat isolation manager 109, according to some implementations.

As illustrated in FIG. 4, an email attachment threat isolation manager 109A may include an email receiving module 401, an attachment assessment module 403, an attachment encryption module 405, an email delivering module 407, a decryption request receiving module 409, an attachment reassessment module 411, and an attachment access responding module 413 that further includes an attachment decryption module 415. In some implementations, the attachment access responding module 413 may further include a cloud-based isolation engine 417. In some implementations, the cloud-based isolation engine 417 may be provided by a separate isolation service that works in conjunction with the email attachment threat isolation manager 109.

The email receiving module 401 may receive emails passed through the email transmission pathway. As previously discussed, the email attachment threat isolation manager 109 may reside in or otherwise access an email transmission pathway. The email receiving module 401 may receive any email that passes through the transmission pathway. For instance, the email receiving module 401 may receive emails generated from different service providers and sent by different senders, which are then transmitted through email servers or gateways in a network of an enterprise or other organization being protected by the email attachment threat isolation manager 109.

The email receiving module 401 may further check whether a received email includes an attachment. If an email does not include an attachment, the email may be transmitted conventionally. However, if an email includes an attachment, the email attachment may be forwarded to the attachment initial assessment module 403 for a potential threat scan.

The attachment initial assessment module 403 may perform an initial scan of an email attachment received by the email attachment threat isolation manager 109. The attachment may be scanned using one or more anti-malware system functionalities, for example, as provided by a centralized anti-malware system 301 which works in conjunction with the email attachment threat isolation manager 109.

In the initial scan, the email attachment is checked against one or more signature libraries in the anti-malware system 301. In some implementations, to decrease the scanning latency for quick delivery of the email, a scan may be performed by using only a subset of the signatures adjudicated to be most likely to result in convictions.

The attachment initial assessment module 403 can categorize the email attachment based on the result of the initial scan. For instance, the attachment initial assessment module 403 may classify the maliciousness status of email attachments as benign, malicious, or unknown. In this context, "unknown" means that an email attachment has a link or other potentially malicious content, the maliciousness status of which cannot be determined definitively based on the available information.

In some implementations, based on the determined maliciousness status of the initial scan, the attachment initial assessment module 403 may communicate with different components in the email attachment threat isolation manager 109, so that proper action can be taken for further email attachment processing. If the email attachment is "benign," the attachment initial assessment module 403 may inform the email delivering module 407 to deliver the email to the email recipient's inbox as a normal email with the attachment un-encrypted. If the email attachment is adjudicated as being malicious, the attachment initial assessment module may cooperate with a certain threat control module (not shown) to control the identified malware (e.g. delete the attachment, move the attachment to a quarantine area, warn the user, or take other security actions as desired). In certain circumstances, the attachment initial assessment module 403 may not determine definitively whether an email attachment is safe or not (e.g., a new, unreported link which is suspicious but for which no adjudication of maliciousness has been made). At this point, the attachment initial assessment module 403 may forward the email attachment with the unknown maliciousness status to the attachment encryption module 405 for encryption of the email attachment.

The attachment encryption module 405 may automatically encrypt a received email attachment to prevent the potential/unknown threat included therein from infecting a recipient's endpoint device. By encrypting the attachment, an email attachment may be protected with a cryptographic key so that only the entities with the corresponding decryption key can access the content of the email attachment. In this way, when the encrypted attachment is delivered to the recipient, the recipient may not have the corresponding decryption key, and thus is not able to open the decrypted attachment on its own.

In some implementations, the attachment encryption module 405 may implement different encryption technologies to encrypt an email attachment. Among these different encryption technologies, different encryption policies may be predefined and centrally managed and enforced for email attachment encryption (and also later decryption). For instance, the attachment encryption module 405 may encrypt an email attachment using Symantec Information Centric Encryption (ICE)® technology. By using the ICE technology, an email attachment may be encrypted into an encrypted text or other content, and wrapped into a container or wrapper that may also include other relevant information, as further discussed later in FIG. 5. As described in detail below, the encryption used is such that an attempt to access the encrypted file may trigger the transmission of a corresponding decryption request back to the email attachment threat isolation manager 109.

Once the encryption is finished, the attachment encryption module 405 may forward the encrypted email attachment to the email delivering module 407 for email transmission.

The email delivering module 407 may forward an email to the corresponding email server for delivering the email to the inbox of the targeted recipient. Emails delivered to the recipient need not include any email attachment, but may include one or more attachments, among which, some may be in an encrypted form while others may be in an unencrypted form (in the clear).

The decryption request receiving module 409 may receive a decryption request from an endpoint device 105 associated with the email recipient. The decryption request may include a request to decrypt the encrypted email attachment sent to the recipient. In some implementations, the decryption request receiving module 409 may also receive credentials accompanying the request. The credentials may include the identification of the recipient, which may be extracted from the email account of the recipient, and/or other information, which may be input by the recipient or automatically gleaned while generating the decryption request. In some implementations, the decryption receiving module 409 may verify the received credentials and determine whether to respond to the decryption request or reject/ignore it.

The attachment reassessment module 411 may perform an email re-scan of an email attachment after receiving the decryption request for an email attachment. Similar to the functionality of the attachment initial assessment module 403, the re-scan process may be implemented in the attachment reassessment module 411 by scanning the attachment against different signature libraries and/or databases maintained by the anti-malware system 301.

The attachment reassessment module 411 and/or the anti-malware system 301 may retrieve information from different sources to obtain new/additional information that is relevant to the re-scanning of the attachment after the initial scan. As noted above, the centralized anti-malware system 301 receives new security telemetry information from a large number of endpoints around the world. As another example, a malware burst may trigger a wide, immediate response/report from different security service providers and security-related professionals. The attachment reassessment module 411 and/or the anti-malware system 301 may frequently automatically receive updates from and/or check various sources for updates concerning the identification of malware, so that more accurate threat detection may be conducted through the re-scan process.

It is to be noted that, while the attachment initial assessment module 403 and the attachment reassessment module 411 are illustrated as two different components, the two different assessment modules may, but need not, be implemented as a single assessment module.

After the re-scan process, the initially determined unknown status of an email attachment may have changed. For instance, an initial "unknown" attachment may be determined to contain one more malicious links, based on the updated information as discussed above. As another example, an initial "unknown" attachment may now be determined to be benign. In some implementations, blacklists and/or whitelists which the anti-malware system 301 maintains or accesses may have been updated with new links that that were "unknown" at the time of the first scan.

In some implementations, even after the re-scan, the attachment reassessment module 411 may still not be able to determine definitively whether an email attachment is "benign" or "malicious," as no updated information is available for the links contained in the attachment, for example where the encrypted attachment is accessed by the recipient imminently after the email delivery.

Whatever the result obtained after the re-scan process, the attachment reassessment module may forward it to the attachment access responding module 413 for further processing.

The attachment access responding module 413 may implement certain actions based on the result from the re-scan process by the attachment reassessment module 411. The attachment access responding module 413 may implement different responses to the access request based on the re-scan result. For this reason, there may include additional components in the attachment access responding module 413 to achieve the corresponding functions.

As illustrated, the attachment access responding module 413 may include an attachment decryption module 415 for decrypting an encrypted attachment, and a cloud-based isolation engine 417 to provide cloud-based or on-premises isolation service.

The attachment decryption module 415 may assist with the decryption of an encrypted email attachment by providing necessary information for decrypting the encrypted attachment. To achieve this, the attachment decryption module 415 may query/retrieve, from different sources, the decryption-related information regarding an encrypted attachment. For instance, the attachment decryption module 415 may determine what methodology was used for the encryption, and what content is included in the encrypted attachment delivered to the recipient. Based on the obtained information, the attachment decryption module 415 may generate a directive to provide necessary information (e.g., a decryption key) and/or an instruction to direct the decryption of the encrypted attachment. The attachment decryption module 415 may transmit the directive to the recipient device for decryption of the encrypted attachment.

In some implementations, the attachment access responding module 413 may also include a cloud-based isolation engine 417 that provides a cloud-based or on-premises isolation service in response to the user's access request.

The cloud-based isolation engine 417 may employ various cloud-based isolation techniques to provide isolation service for presenting an email attachment to the end user or recipient. By using the isolation service, the attachment is decrypted and opened remotely in a containerized environment, and thus any malware and other threats, including JavaScript and Flash, are prevented from ever reaching the recipient's device or network. The recipient is provided with a safe view of the content in the attachment on a cloud device (which may be different from or the same as a cloud device 103), which enables seamless and transparent access of the file without requiring any decrypting or opening of the file on the endpoint. In one implementation, the cloud-based isolation engine 417 is instantiated as or in conjunction with a document or web isolation platform, such as that provided by Symantec, which allows a recipient to view, manipulate, and print an email attachment without downloading the attachment to the recipient's computing device.

It should be noted that specific components described above for the email attachment threat isolation manager 109 are provided for propose of illustration and example, and should not be constructed as limiting. In some implementations, the email attachment threat isolation manager 109 may include additional, fewer, or different components.

FIG. 5 is a flowchart of an example method for implementing a cloud-based threat isolation service for email attachments.

At step 502, the email attachment threat isolation manager 109 receives an email with an attachment sent from an email sender to a target recipient. The email attachment threat isolation manager 109 may reside in the email transmission pathway, for instance on an email security gateway or server. The email sent by the sender is received first by the email attachment threat isolation manager 109 before it reaches the targeted recipient(s). The email may include one or more email attachments that are sent together with the email by the email sender. While only one email attachment is described in conjunction with FIG. 5, in some implementations, multiple attachments may be processed simultaneously or independently in the same manner by the email attachment threat isolation manager 109.

At step 504, the email attachment threat isolation manager 109 may perform an initial scan of the received email attachment. Any links or other potential malicious content found in the email attachment may be checked against one or more signature libraries or the like to determine whether a known threat exists.

At step 506, the email attachment threat isolation manager 109 determines the maliciousness status of the attachment, based on the initial scan of the attachment, as being "malicious," "benign," or "unknown," where "malicious" indicates a detection of malware in the attachment, and "benign" indicates a determination that the attachment is free of malware. For instance, if one or more links detected in the email attachment are identified as being safe, the email attachment can be labeled as "benign." If one or more links are found to point to malicious sites as per known signatures, the email attachment is labeled as "malicious." In certain circumstances, the anti-malware system will be unable to definitively adjudicate the email attachment as being malicious or benign based on the current signature libraries or other information. In this scenario, the email attachment threat isolation manager 109 considers the maliciousness status of the email attachment as "unknown," indicating a possible risk in the email attachment.

At step 508, if the maliciousness status of the email attachment is determined to be "malicious," the email attachment threat isolation manager 109 may implement certain threat control mechanisms to prevent the malware contained in the attachment from spreading into the device(s) of the email recipient. For instance, the email attachment threat isolation manager 109 may directly remove or deactivate the malicious link found in the attachment, so that no malware is delivered to the recipient. In some implementations, the email attachment threat isolation manager 109 may also generate an alert message to notify the recipient of the potential risk found in the email attachment, and deliver the message to the recipient's account. Other example security actions that can be taken at this point include not delivering the attachment to the recipient, redacting the attachment, etc. It is to be noted that the above-described implementations may be implemented independently or in various combinations to achieve a desirable effect in controlling the threat.

At step 510, if the maliciousness status of the email attachment is determined to be "benign," the email attachment threat isolation manager 109 may proceed to send the email attachment directly to the recipient's account in the clear. For instance, the email attachment may be sent with the email body to the recipient in its native form as originally prepared by the email sender, which is ready to be opened locally on the recipient's device after the reception of the email and attachment by the recipient.

At step 512, if the maliciousness status of the email attachment is determined to be "unknown," the email attachment threat isolation manager 109 may automatically encrypt the email attachment before sending the attachment to the recipient's inbox. An "unknown" status of the email attachment indicates a potential risk associated with the email attachment. Hackers and practitioners of malware distribution are well aware of the current state of the capabilities of anti-malware vendors, and try to avoid the detection of malware distribution by using different forms and variations of malware and distribution channels.

To encrypt the email attachment, different methodologies may be implemented. For instance, the email attachment threat isolation manager 109 may use Symantec Information Centric Encryption (ICE)® technology for this purpose. During the encryption, a file encryption key (FEK) may be generated for the email attachment. The generated FEK key may be, for example, a symmetric AES (Advanced encryption standard)-256 key. A global unique identifier (GUID) may be also generated or tagged for the email attachment during the encryption. The generated FEK and GUID may be identified as "children" of the original attachment, and may be wrapped together with the encrypted attachment in a container (which may also be called a "wrapper") as an encrypted file with a payload (e.g., HTML file) delivered to the recipient. Under ICE (or similar methodologies), when the user attempts to access the encrypted attachment, the payload runs, and sends a notification to the backend (in this case, the email attachment threat isolation manager 109) indicating that the user is attempting to access the file. In other implementations, other encryption technologies can be used, provided that a) the encrypted attachment is not accessible to the user without a decryption component that can be supplied by the backend, and b) an attempt by the user to access the encrypted file causes a notification to be sent to the backend.

At step 514, the email attachment threat isolation manager 109 delivers the encrypted email attachment to the user account of the recipient. At some subsequent time (which can be within minutes, hours, or weeks of receipt), the user attempts to access the attachment.

In response, at step 522, the email attachment threat isolation manager 109 receives a notification of the attempt to access the file from the endpoint device 105 associated with the recipient. This notification can be thought as the decryption request. The decryption request is automatically generated and transmitted to the email attachment threat isolation manager 109 when the recipient attempts to access the attachment as described above.

In some implementation, before or in conjunction with generating the decryption request, an authentication step may be executed to verify the request. For instance, upon the attempt to access the encrypted attachment, the payload of the file may trigger a login to establish a communication with a backend server (independently of or integrated with the cloud device 103) to verify the credentials of the entity providing the request. Typically, such authentication is used to determine whether the party attempting to decrypt the file is authorized to do so. The communication to the backend when an attempt to access the file is used here to alert the email attachment threat isolation manager 109, which can perform the isolation functionalities described below.

At step 524, upon reception of the decryption request, the email attachment threat isolation manager 109 re-scans the email attachment to determine its current maliciousness status. It is to be noted that the scanning and subsequent re-scanning of email attachments are transient processing operations. Files need not be stored "long-term" by the provider of the email attachment threat isolation manager 109. This provides data-residency and compliance benefits.

In some scenarios, during the time interval between the initial scan and the time that the recipient attempts to access the attachment, additional information concerning the link(s) or other suspicious content in the attachment may have become available to the anti-malware system 301. As previously discussed, any malicious links or other malware in the attachment may be sufficiently new that it has been identified and a signature or the like has been generated during the time interval, and thus although libraries used in the initial scan did not initially include an identifier of the malware, such an identifier is now available at the time of the re-scan. Thus, the re-determined maliciousness status may be different from the maliciousness status determined from the initial scan. For instance, one or more links in the attachment initially determined to be "unknown" may now be determined to be "malicious" or "benign."

At step 526, the email attachment threat isolation manager 109 may determine the maliciousness status of the email attachment based on the result of the re-scan. As with the initial scan, the re-determined maliciousness status of the email attachment may be determined to be "benign," "malicious," or "unknown" as a result of the re-scan process.

In response to the determined maliciousness status of the attachment being "malicious," the email attachment threat isolation manager 109 implements certain threat control mechanisms to prevent the malware contained in the attachment from spreading into the endpoint device(s) 105 of the recipient, as discussed above.

At step 528, in response to the determined maliciousness status of the attachment being "benign," the email attachment threat isolation manager 109 may decrypt the encrypted email attachment to allow the email attachment to be opened locally on the endpoint device 105 of the recipient. To achieve this, the email attachment threat isolation manager 109 may provide a directive to the endpoint device 105. The directive may include different content, depending on how the attachment is encrypted and what is included in the encrypted payload. In some implementations, the directive may include a decryption key to decrypt the encrypted attachment, and policies or instructions to decrypt the encrypted attachment. For instance, the directive may direct the wrapper as to where to locate the decryption key for the decryption.

At step 532, in response to the determined maliciousness status of the email attachment still being "unknown," the email attachment threat isolation manager 109 may use cloud-based isolation to provide the recipient access to the encrypted attachment.

To do so, the email attachment threat isolation manager 109 may first store a copy of the un-encrypted email attachment in a location that is remote to the recipient's endpoint device. The email attachment threat isolation manager 109 may use the cloud-based isolation functionality to allow the recipient to view, edit, print, and otherwise interact with the remotely located un-encrypted attachment. For example, a cloud device may display the remotely located attachment in a browser to the recipient. In this way, any potential threat or malicious link is processed remotely from the recipient device, so that even if there is a potential threat, the threat is isolated from the recipient device and the network in which the recipient device is located, thereby enabling the recipient to access the attachment while effectively preventing the malicious links in the email attachment from reaching the endpoint device and the network.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

What is claimed is:

1. A computer-implemented method for providing threat isolation for email attachments, the method comprising:
   receiving, by a cloud device, an email with an attachment sent to a user account;
   determining, by the cloud device, a maliciousness status of the attachment as being one of the following statuses: malicious, benign, and unknown;
   responsive to determining that the maliciousness status of the attachment is unknown, automatically encrypting the attachment, by the cloud device;
   transmitting the email with the encrypted attachment to the user account, by the cloud device;
   receiving, by the cloud device, an indication of an attempt to access the encrypted attachment by an endpoint device;
   responsive to the attempt to access the encrypted file, re-determining, by the cloud device, the maliciousness status of the attachment as being one of the following statuses: malicious, benign, and unknown; and
   performing, by the cloud device, an additional action concerning the attempt to access the encrypted attachment, in response to the re-determined maliciousness status.

2. The method of claim 1, wherein automatically encrypting the attachment further comprises:
   encrypting the attachment such that an attempt to access the encrypted attachment by an endpoint device triggers transmitting a corresponding indication to the cloud device.

3. The method of claim 1, wherein performing an additional action concerning the attempt to access the encrypted attachment further comprises:
   responsive to the re-determined maliciousness status of the encrypted attachment being benign, automatically decrypting the encrypted attachment, thereby allowing access of the attachment by the endpoint device.

4. The method of claim 3, wherein automatically decrypting the encrypted attachment further comprises:
   automatically providing a decryption key to the endpoint device, thereby enabling decryption of the encrypted attachment.

5. The method of claim 1, wherein performing an additional action concerning the attempt to access the encrypted attachment further comprises:
   responsive to the re-determined maliciousness status of the encrypted attachment being malicious, taking a security action concerning the attempt to access the encrypted attachment.

6. The method of claim 5, wherein taking a security action concerning the attempt to access the encrypted attachment further comprises:
   generating an alert message warning of maliciousness of the encrypted attachment.

7. The method of claim 5, wherein taking a security action concerning the attempt to access the encrypted attachment further comprises:
   deleting the encrypted attachment.

8. The method of claim 1, wherein performing an additional action concerning the attempt to access the encrypted attachment further comprises:
   responsive to the re-determined maliciousness status of the encrypted attachment being unknown, providing access to the encrypted attachment on the endpoint device using an isolation service.

9. The method of claim 8, wherein providing access to the encrypted attachment on the endpoint device using an isolation service further comprises:
   storing the attachment in a remote location available to a cloud-based isolation engine providing a cloud-based isolation service;
   generating a link between the encrypted attachment transmitted to the user account and the attachment stored in the remote location; and
   providing the endpoint device access to unencrypted content of the attachment stored in the remote location via the link, in response to the attempt to access the encrypted attachment by the endpoint device.

10. The method of claim 9, further comprising:
    responsive to a detection of one or more malicious links in the unencrypted content of attachment, processing the attachment stored in the remote location by removing or turning off the one or more malicious links without affecting a display of other content in the attachment;
    generating a revised version of the unencrypted content of attachment with the one or more malicious links being removed or turned off; and
    providing the revised version of the unencrypted content of the attachment to the endpoint device.

11. The method of claim 8, wherein providing access to the encrypted attachment on the endpoint device using an isolation service further comprises:
    providing unencrypted content of the attachment to a user on the endpoint device in a browser window via a cloud-based viewing platform, in response to the attempt to access the encrypted attachment by the endpoint device.

12. The method of claim 8, wherein providing access to the encrypted attachment on the endpoint device using an isolation service further comprises:
    providing read/write access to the unencrypted content of the attachment displayed in a browser window on the endpoint device.

13. A computer system for providing threat isolation for email attachments, the computer system comprising:
    at least one processor;
    a system memory;
    an email receiving module residing in the system memory and programmed to receive an email with an attachment sent to a user account;

an attachment initial assessment module residing in the system memory and programmed to determine a maliciousness status of the attachment as being one of the following statuses: malicious, benign, and unknown;

an attachment encryption module residing in the system memory and programmed to, responsive to determining that the maliciousness status of the attachment is unknown, automatically encrypt the attachment;

an email delivering module residing in the system memory and programmed to transmit the email with the encrypted attachment to the user account;

a decryption request receiving module residing in the system memory and programmed to receive an indication of an attempt to access the encrypted attachment by an endpoint device;

an attachment reassessment module residing in the system memory and programmed to, responsive to the attempt to access the encrypted file, re-determine the maliciousness status of the attachment as being one of the following statuses: malicious, benign, and unknown; and an attachment access responding module residing in the system memory and programmed to perform an additional action concerning the attempt to access the encrypted attachment, in response to the re-determined maliciousness status.

14. The system of claim 13, wherein the attachment encryption module is further programmed to:

encrypt the attachment such that an attempt to access the encrypted attachment by an endpoint device triggers transmitting a corresponding indication to the cloud device.

15. The system of claim 14, wherein the attachment encryption module is further programmed to:

automatically provide a decryption key to the endpoint device, thereby enabling decryption of the encrypted attachment.

16. The system of claim 13, wherein the attachment access responding module is further programmed to:

responsive to the re-determined maliciousness status of the encrypted attachment being benign, automatically decrypt the encrypted attachment, thereby allowing access of the attachment by the endpoint device.

17. The system of claim 13, wherein the attachment access responding module is further programmed to:

responsive to the re-determined maliciousness status of the encrypted attachment being malicious, take a security action concerning the attempt to access the encrypted attachment.

18. The system of claim 13, wherein the attachment access responding module is further programmed to:

responsive to the re-determined maliciousness status of the encrypted attachment being unknown, provide access to the encrypted attachment on the endpoint device using an isolation service.

19. The system of claim 18, wherein the attachment access responding module is further programmed to:

store the attachment in a remote location available to a cloud-based isolation engine providing a cloud-based isolation service;

generate a link between the encrypted attachment transmitted to the user account and the attachment stored in the remote location; and provide the endpoint device access to unencrypted content of the attachment stored in the remote location via the link, in response to the attempt to access the encrypted attachment by the endpoint device.

20. At least one non-transitory computer-readable storage medium for threat isolation for providing threat isolation for email attachments, the at least one non-transitory computer-readable storage medium storing computer executable instructions that, when loaded into computer memory and executed by at least one processor of a computing device, cause the computing device to perform the following steps:

receiving, by a cloud device, an email with an attachment sent to a user account;

determining, by the cloud device, a maliciousness status of the attachment as being one of the following statuses: malicious, benign, and unknown;

responsive to determining that the maliciousness status of the attachment is unknown, automatically encrypting the attachment, by the cloud device;

transmitting the email with the encrypted attachment to the user account, by the cloud device;

receiving, by the cloud device, an indication of an attempt to access the encrypted attachment by an endpoint device;

responsive to the attempt to access the encrypted file, re-determining, by the cloud device, the maliciousness status of the attachment as being one of the following statuses: malicious, benign, and unknown; and performing, by the cloud device, an additional action concerning the attempt to access the encrypted attachment, in response to the re-determined maliciousness status.

* * * * *